July 30, 1946.  T. ULRICH  2,404,870

BODY FOR VEHICLES, ESPECIALLY FOR PLEASURE AUTOMOBILES

Filed July 17, 1941  4 Sheets-Sheet 1

INVENTOR
Theodore Ulrich
BY John P. Tarbox
ATTORNEY

July 30, 1946. T. ULRICH 2,404,870
BODY FOR VEHICLES, ESPECIALLY FOR PLEASURE AUTOMOBILES
Filed July 17, 1941 4 Sheets-Sheet 2
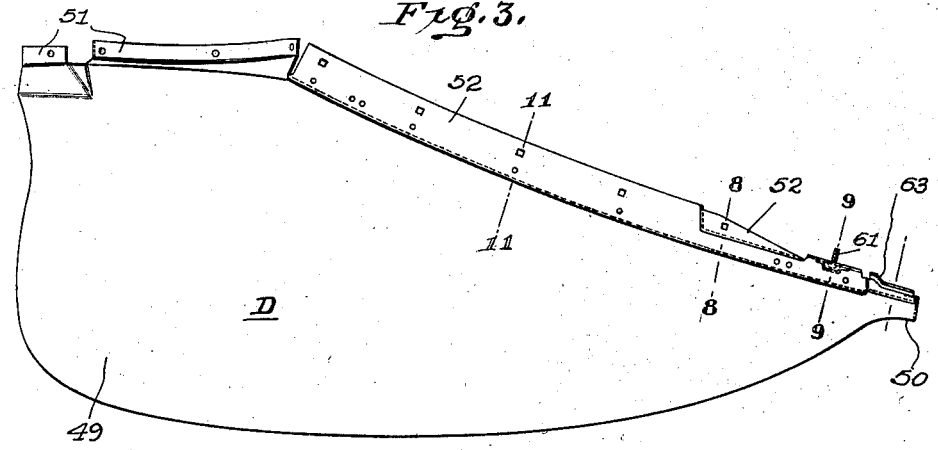
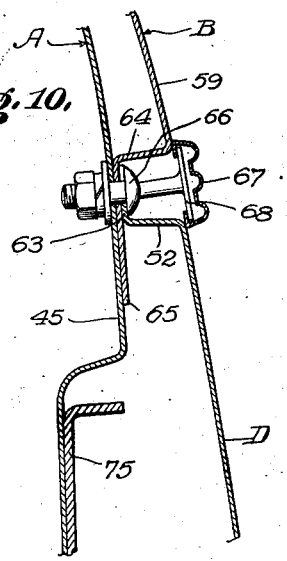
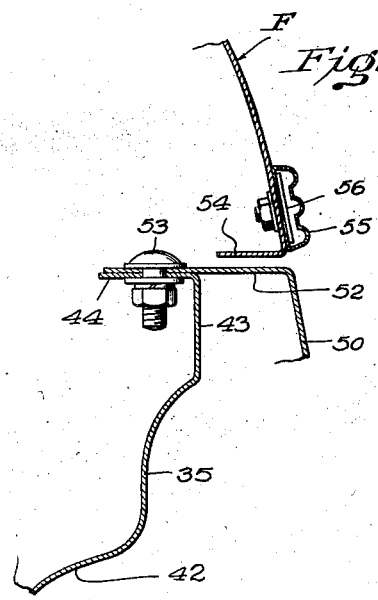
INVENTOR
Theodore Ulrich
BY John P. Tarbox
ATTORNEY July 30, 1946. T. ULRICH 2,404,870
BODY FOR VEHICLES, ESPECIALLY FOR PLEASURE AUTOMOBILES
Filed July 17, 1941 4 Sheets-Sheet 3
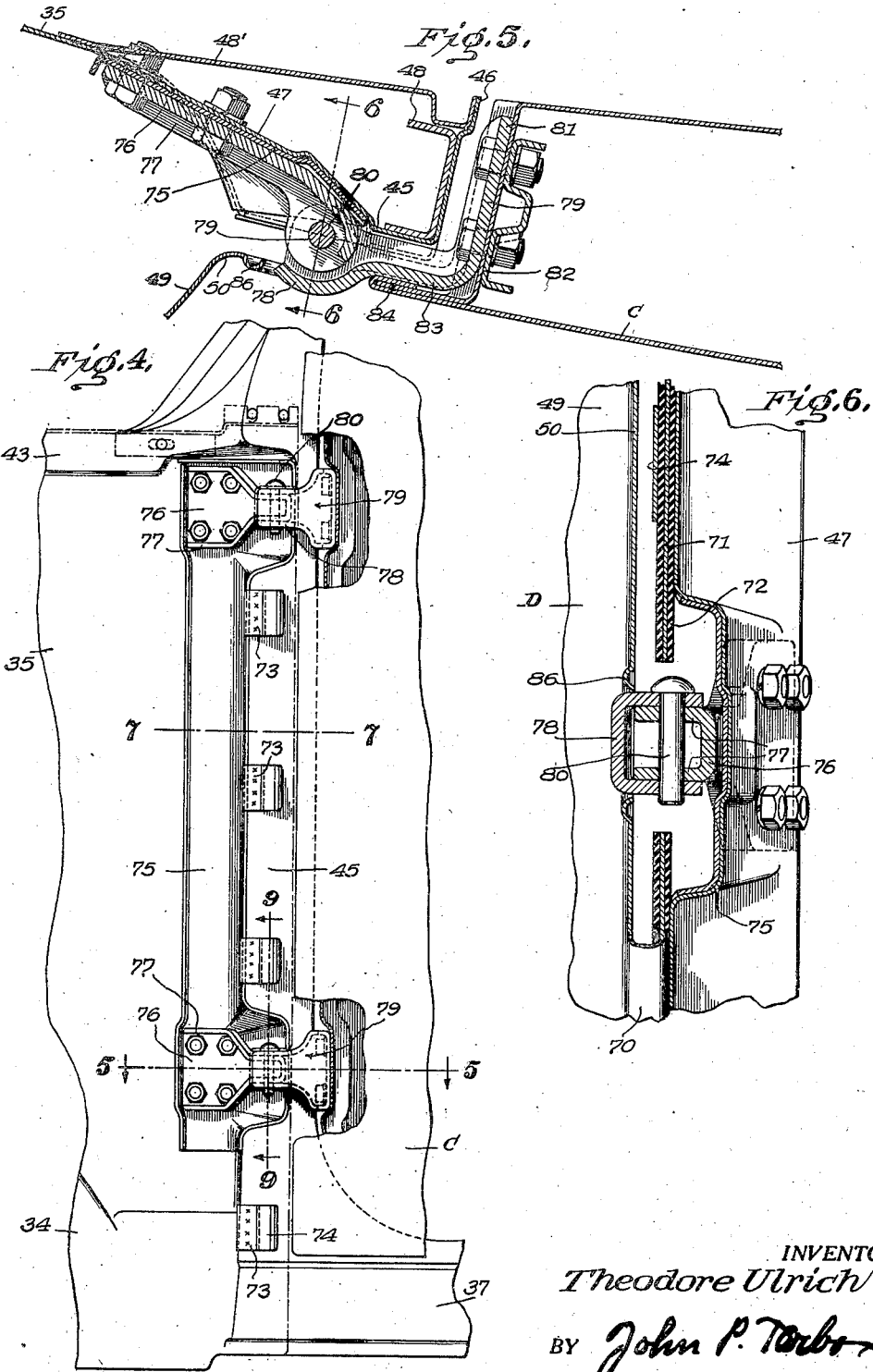
INVENTOR
*Theodore Ulrich*
BY *John P. Torbox*
ATTORNEY July 30, 1946. T. ULRICH 2,404,870
BODY FOR VEHICLES, ESPECIALLY FOR PLEASURE AUTOMOBILES
Filed July 17, 1941 4 Sheets-Sheet 4
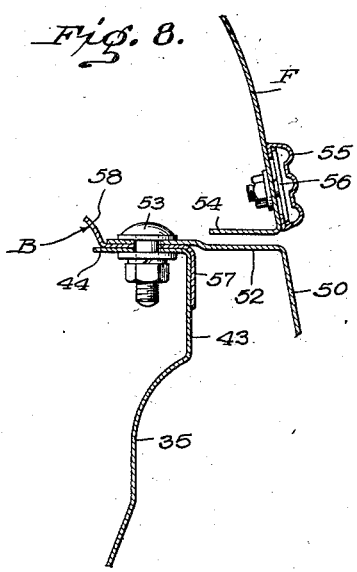
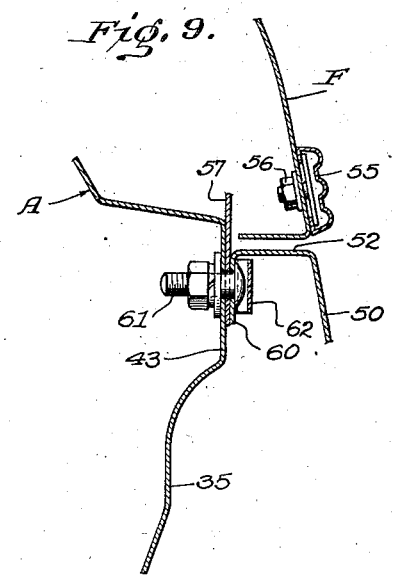
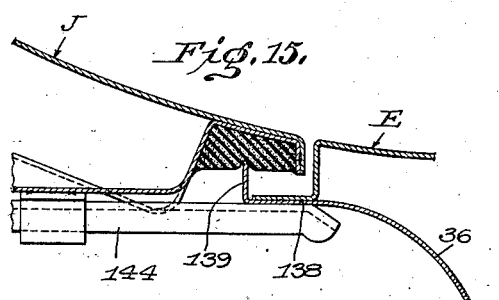
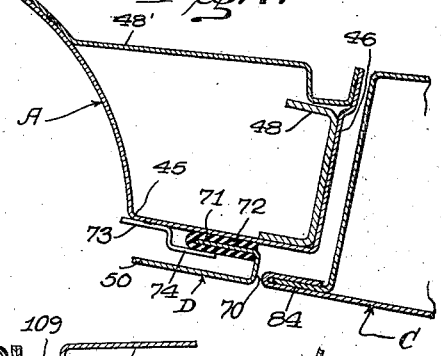
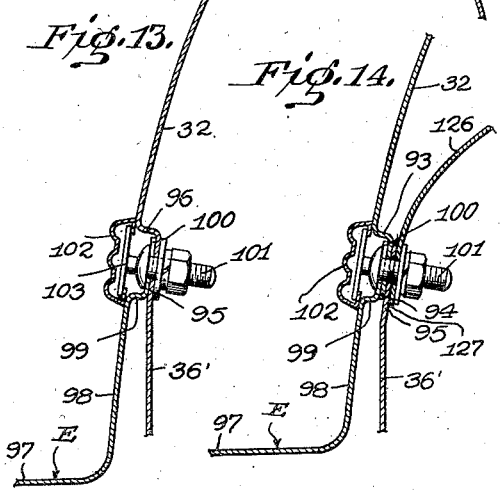
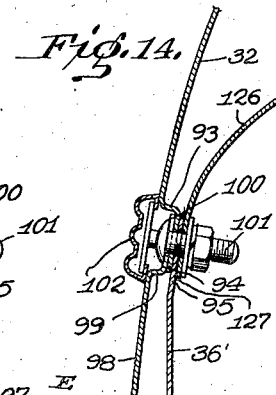
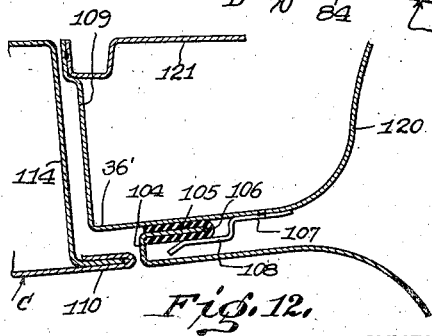
INVENTOR
Theodore Ulrich
BY John P. Tabor
ATTORNEY Patented July 30, 1946

2,404,870

UNITED STATES PATENT OFFICE 2,404,870

BODY FOR VEHICLES, ESPECIALLY FOR PLEASURE AUTOMOBILES

Theodore Ulrich, Milwaukee, Wis., assignor to Edward G. Budd Manufacturing Company, Philadelphia, Pa., a corporation of Pennsylvania Application July 17, 1941, Serial No. 402,878

6 Claims. (Cl. 296—28)

The invention relates to improvements in the construction of motor vehicles and more particularly of pleasure automobiles.

More specifically, the object of the invention is an improved fender and fender arrangement facilitating the initial installation of the fender and the repair or replacement of the fender and adjacent body panel portions in case of damage.

The features of the invention will become apparent from the following description of an embodiment and the illustration of the latter in the attached drawings.

In the drawings:

Figure 3 is a plan view of one of the front fenders on a larger scale than in Figures 1 and 2;

Figure 4 is a fragmentary side elevation of the body in the region of the lower section of a front door post showing the hinges for the front door and the adjacent section of the door, the scale being larger than that of Figures 1 and 2;

Figure 5 is a horizontal section through one of the front door hinges and the adjacent body and door portions along line 5—5 of Figure 4 (or Figure 1), yet on a larger scale;

Figure 6 is a fragmentary section along line 6—6 of Figures 4 and 5 on about the scale of Figure 5, showing in section also a portion of the fender which is, for the sake of clarity, omitted in Figure 4;

Figure 7 is a section through the front door post and adjacent side wall and front door post portions along the line 7—7 of Figure 4 (or Figure 1) on about the same scale as Figures 5 and 6;

Figures 8, 9, 10 and 11 are vertical fragmentary sections through the fender, the adjacent motor compartment wall and the motor hood or the cowl in the region where these members meet along the correspondingly numbered lines of Figure 1 (see also Figure 3), yet on a larger scale than Figure 1;

Figure 12 is a horizontal section through the rearmost door post along the correspondingly numbered line of Figure 1, on a larger scale than Figure 1 and on about the scale of Figures 4 to 7, and showing the construction of the body in the rear post region between the hinge connections;

Figures 13 and 14 are vertical fragmentary sections in the belt-line region behind the rear door post, along the correspondingly numbered lines of Figure 1, yet on a larger scale;

Figure 15 is a vertical fragmentary section in the region where the fender, the body side wall and the lid for the luggage compartment meet, along line 15—15 of Figure 1, yet on a larger scale.

Figure 1:
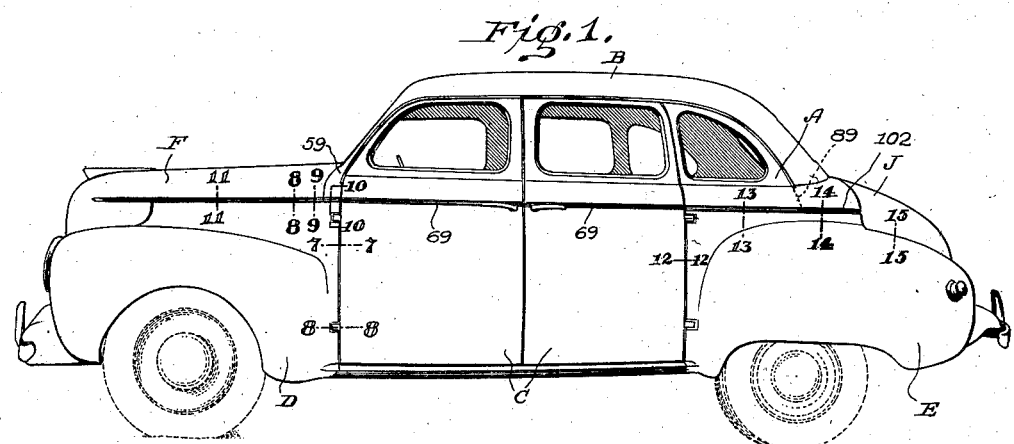
Figure 1 is a side elevation of an automobile having a body built in accordance with the invention.

The body superstructure shown in the drawings comprises but a few large units or one-piece stampings, to wit: the side wall units or stampings A; the combined windshield-, roof-, and rear wall-stamping or unit B; the doors C; the front fenders D, the rear fenders E, the motor hood F, the radiator grille G, the lower front transverse member H, the luggage compartment lid J and the rear lower cross member K.

The side wall units or stampings A extend practically over the entire length of the automobile so as to surround the door openings 30, 31, and so as to form the upper portion of the rear quarter side panel 32 with the rear quarter side window 33, the front wheel housing 34 and the remaining portion 35 of the motor compartment side wall, the rear wheel housing 36 and adjacent lower panel portions 36'; the threshold portions 37, the upper door rail portions 38, the middle door post 39, the front door post portion 40, and the rear door post portion 41.

Figure 2:
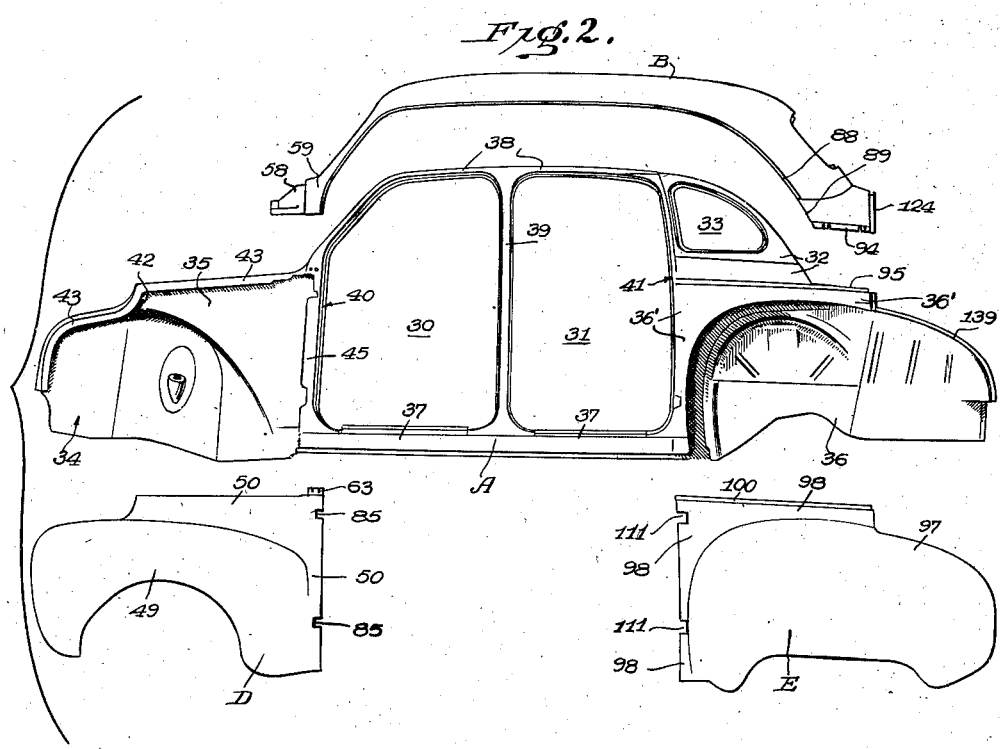
Figure 2 is an exploded view of one side wall member, the appertaining fenders, and of the roof of the body on a larger scale.

The front wheel housing 34 comprises the generally vertical skirt and the crown 42, which latter merges into the motor compartment side wall portion 35. The portion 35 is outwardly offset at 43 along its upper margin, which offset is forwardly continued along the forward part of the wheel housing 34, as shown in Figure 2. An inwardly extending flange 44 is provided along the greater part of the offset portion 43.

The rear marginal portion of the wall 35 is likewise outwardly offset at 45 and then provided with an inwardly directed flange 46 which forms the jamb face of the front door post. An inclined portion 47 connects the offset portion 45 and the main body of the portion 35. The flange 46 is reinforced by a U-section rail 48 which nests in the angle formed by the offset 45 and the flange 46 and is connected with these portions. The space between the inner margin of the flange 46 and the main body of panel portion 35 is bridged by a panel 48' so that a closed box-sectional lower post structure is formed.

The front fender unit D comprises the fender portion 49 proper and upwardly and rearwardly extending panel portions 50. The forward marginal portions of the fender 49 proper and the forward upper margins of the panel portion 50 are provided with inwardly directed flanges 51 and 52 which overlap and are connected, such as by bolts and nuts 53, to the flange 44 of the wheel housing and side wall panel portions 34, 35. The forward parts of the flanges 44, 52 and 51 are connected to the radiator grille and a cross panel member (not shown).

The ledge formed by the remainder of the flange 51 and by the flange 52 is covered by the marginal portion 54 of the hood F. The margin of the hood F which overlies flange 52 is arranged at the height of the belt-line and provided with a belt-line molding 55 held by clips or the like 56. This molding 55 extends forwardly beyond the end of the flange 52 where the hood extends downwardly.

The rearward portion of flange 44 is connected to the marginal portion 57 of the cowl extension 58 which forms part of the windshield-, roof-, rear-wall-unit B. Flange 44 and the marginal portion 57 are rigidly secured to one another such as by spot welding; the flange 52 of the fender overlies in this region the upper surface of the marginal cowl portion 57—see Figure 8.

Slightly in front of the cowl portion 59 proper, the flange 52 of the wheel housing member D is provided with a downwardly directed flange 60. A bolt 61 is held by a clip 62 fastened to said flange 60 and extends through the side wall offset 43 and the downwardly extending marginal portion 57 of the cowl extension 58—see Figure 9.

In the region of the cowl 59 proper and of the front or A-post, the fender unit D has its flange 52 upwardly extended at 63. The lower margin of the cowl 59 is—see Figure 10—inwardly and downwardly offset at 64—65. This offset overlaps and is permanently fastened, such as by spot welding, to the offset portion 45 of the side wall unit A. The extension 63 is attached to the offset portion 65 and 43 by a couple of bolts and nuts 66.

The channel formed by the flange 52 and offset 64 between the door opening 30 and the rear side corner of the hood F is covered by a belt-line moulding 67 held by clips or the like 68—see Figure 10. This moulding 67 forms a continuation of the moulding 55 along the hood F and is continued by similar moulding strips 69 attached to or formed on the doors C—see Figure 1.

The front fender unit D is provided along its rear margin with a narrow inwardly directed flange 70 which is continued by a forwardly directed flange or tabs 71. This flange 71 is covered continuously or at certain intervals with a rubber or the like cover 72. Z-shaped clips 73 are attached to the offset portion 45 of the side wall unit and the flange 71 is slid from the rear under the outwardly offset arms 74 of these clips and held there firmly and without danger of rattling due to the resiliency of the clips and of the rubber covering 72.

The side wall portion 47 is reinforced below the belt-line by a stamping or the like 75. One member 76 each of two vertically spaced hinges is fastened to the side wall at the ends of the reinforcing member 75. These members 76 are reinforced by marginal flanges 77 which converge toward the rear of the car and form together with the remaining main portion of the member 76 a narrow U-section member. The correspondingly shaped outer end 78 of the second hinge member 79 is slid over the rear end of the member 76 and the two ends are journaled to one another by a hinge pin 80.

The inner arm 81 of the hinge member 79 is secured to the hinge rail 82 of the front door C, and the other arm 83 is arranged on the inside of the door overlap flange 84.

The front fender unit D is provided with cutouts 85 at the location of the hinges and the margins of these cut-outs are reinforced by pressed-out beadings 86—Figures 1, 2, 5 and 6. These cut-outs portions are practically completely closed by the forward portion 78 of the respective hinge arm 83. This portion 78 is curved concentrically to the axis of the hinge pin 80 so that in all positions the cut-out portions 85 are nearly completely covered.

After the assembly of the stationary parts of the body and the attaching of the front door hinges, the flange 71 of the front fender unit D is slid from the rear under the arms 74 of the clips 73, then fastened by its flanges 63, 60, 52 and by means of the bolts 66, 61, 53 to the margins of the side wall portion 35 and of the wheel housing 34. The connection of the cowl and D post region is then covered by the moulding strip 67.

The construction of the upper portion of the front door post 40, of the header rail 38 above the door openings 30, 31, of the rear quarter side window 33, as well as of the adjacent parts of the windshield-, roof-, and rear-wall-unit B, and the relative arrangement of these members and their connection may be conventional and is, therefore, not shown or described in detail. The connection between the units A and B is hidden from view for the greater part of its length by the drip channel 88 so that only the short seam 89 between the end of the channel 88 and the belt-line requires a careful finishing operation.

The lower horizontal side margin of the unit B in rear of the seam 89 is inwardly and downwardly offset at 93 and 94—Figure 14—so that the offset marginal portion 94 overlies and is fastened, such as by spot welding, to the marginal portion 95 of the panel portion 36' below the belt-line. In front of the seam 89, the side panel portion 36' is similarly offset at 96 with regard to the upper rear quarter side portion 32.

The rear fender unit E comprises a fender portion 97 proper and upwardly and forwardly extending panel portions 98. The upwardly extending panel portion 98 is inwardly and upwardly offset at 99 and 100. The offset portion 100 is fastened to the side panel portion 95 so that between the offset 99 of the panel E and the offset 96 of the unit B and the offset 93 of the panel 32 an outwardly facing channel is formed which receives the heads of the fastening bolts 101 for the unit E. This channel is covered by a moulding 102 held by clips 103. This moulding 102 forms a continuation of the door moulding 69. The construction of this connection between the fender E and the units A and B and of the moulding 102 is similar to the construction for the front fender, as shown in Figure 10.

The fender unit E is provided along its front margin with inwardly and rearwardly directed flanges or tabs 104, 105, the latter being covered by rubber 106. Z-shaped clips 107 are connected in the region of the door post 41 to the panel 36'. The flange 105 with its rubber covering 106 may be slid under the free arms 108 of the clips 107 and then held in place there. In this respect the construction corresponds to the construction of the front fender D and its connection as shown in Figure 7.

The main portion of the panel 36' in the rear of the jamb face 109 along the rear door post forms, together with the flange 104 of the fender unit E, a rabbet for the reception of the overlap flange 110 of the rear door C—Figure 12. The same is of course also true for the front fender flange 70, the panel portion 45 and the overlap flange 84 of the front door—Fig. 7.

The fender unit E is provided with cut-outs 111 similar to the cut-outs 85 of the front fender, which are filled in by the rear hinge members the construction of which is very similar to the construction and the arrangement of the corresponding parts of the front hinges.

The space between the jamb portion 109 and the crown 120 of the wheel housing 36 is closed by an inner reinforcing panel 121.

A shelf 126 which fills the space between the rear wall and the upper margin of the rear seat back cushion (not shown) has its ends 127 fastened such as by welding to the roof unit B and to the side units A along the marginal offsets 94, 95 where these two units overlap one another (Figure 14).

The wheel housing skirt 36 has its upper margin provided with inwardly and upwardly directed flanges 138, 139, which define the luggage compartment opening—Figure 15.

The wheel housing unit E is provided along the luggage compartment opening with inwardly and laterally directed flanges which overlie and are removably fastened to the flange 138 of the side wall, such as by bolts (not shown).

The construction of the luggage compartment lid J may be substantially conventional. 144 in Figure 15 indicates one of the lock bolts for the lid J.

The rear fender unit E is attached to the body by first sliding its marginal flange 105 with the rubber covering 106 under the arms 108 of the clips 107, by then removably fastening the upper and rear marginal portions by their flanges 100, 141 and by means such as bolts 101 to the body side wall along the belt-line and along the lateral marginal portions of the luggage compartment opening, and finally covering the connection along the belt-line with the moulding strip 102 held by the clips 103.

It will be understood that the attachment of the fender or its removal and replacement in case of an accident is extremely simple. Adjacent portions of the side wall panels, which are very often damaged together with the fender in case of accident, form one piece with the fender proper. It is mostly no more necessary to blend the color of a replaced or straightened fender in with the color of the main portion of the body because the fender is now separated from the upper body section by the belt-line moulding. There is no need anymore for weatherstrips along the connecting lines between the fender and the remainder of the body.

It will be understood that the units shown in the drawings do not necessarily constitute one-piece integral stampings. Especially in the case of the side wall units it will often be found more economical to constitute the unit from a number of separately manufactured members. Nearly all portions of the side wall units are in the completed body hidden from view, either by the roof unit or by the fender units or by the doors. In the shown embodiment the only large part of the side wall unit which is not hidden from view is the upper portion 32 of the rear quarter side panel around the rear quarter side window 33, so that the entire unit with the exception of this last-named region might be made from comparatively cheap, coarse sheet metal and only said portion of the rear quarter side window may be made from more expensive sheet metal stock having a smooth finish.

The connections between the upper portion of the rear wall and the side walls are very simple because only the very short flange connection along line 89 between the end of the drip channel 88 and the belt line require finishing operation. It will, moreover, be understood that the invention is not at all restricted to the specific form and extent of the side wall and roof unit, but that its features may be used for many types of bodies. The invention is likewise not restricted to any specific type of material, although the illustrated embodiment is thought to be made of the standard body material: sheet metal.

All modifications of the invention which will occur to those skilled in the art are intended to be covered by the appended claims with the exception of such features which form the subject matter of applicant's copending application Serial No. 437,500 for "Door suspension for vehicles especially automobiles," filed April 3, 1942, as a division of the present application. This divisional application matured into Patent 2,383,428, issued April 21, 1945.

What is claimed is:

1. In a vehicle body, a wall comprising an opening having a jamb face and being adapted to be closed by a closure member, a fender arranged on the outside of said wall at a short distance from the jamb face of said opening, an integral panel extension of said fender overlying part of but being slightly spaced from the outer surface of said wall between said fender and said opening, means for removably connecting the margin of said fender extension along said opening to said wall, said fender extension being provided along the margin removably connected to said wall with inwardly and laterally extending flanges or tabs, the laterally extending flanges or tabs projecting from the inwardly directed flange in the same direction as the adjacent portion of the fender extension, means on said wall slidably engaged by said laterally extending flanges or tabs so that by moving said fender with its extension in a plane substantially parallel to the plane of the opening and away from the center of the opening the fender may be easily disconnected from the wall or reattached to it by the reverse procedure.

2. In a vehicle body, a wall comprising an opening having a jamb face and being adapted to be closed by a closure member, a fender arranged on the outside of said wall at a short distance from the jamb face of said opening, an integral panel extension of said fender overlying part of but being slightly spaced from the outer surface of said wall between said fender and said opening, means for removably connecting the margin of said fender extension along said opening to said wall, said fender extension being provided along the margin removably connected to said wall with inwardly and laterally extending flanges or tabs, the laterally extending flanges or tabs projecting from the inwardly directed flange in the same direction as the adjacent portion of the fender extension, the wall being provided with means slidably engaged by said laterally extending flanges or tabs so that the fender may be easily disconnected from the wall by moving said fender in a plane substantially parallel to the plane of the opening and away from the center of the opening, resilient means being inserted between said laterally extending flanges or tabs and said means provided on said wall.

3. In a vehicle body, a wall comprising an opening having a jamb face and being adapted to be closed by a closure member, a fender arranged on the outside of said wall at a short distance from the jamb face of said opening, an integral panel extension of said fender overlying part of but being slightly spaced from the outer surface of said wall between said fender and said opening, means for removably connecting the margin of said fender extension along said opening to said wall, said fender extension being provided along the margin removably connected to said wall with inwardly and laterally extending flanges or tabs, the laterally extending flanges or tabs projecting from the inwardly directed flange in the same direction as the adjacent portion of the fender extension and being covered by elastic material such as rubber, the wall being provided with means slidably engaged by the rubber covering of said laterally extending flanges or tabs so that by moving said fender in a plane substantially parallel to the plane of the opening and away from the center of the opening it may easily be disconnected from said wall.

4. In a vehicle body, a wall comprising an opening having a jamb face and being adapted to be closed by a closure member, a fender arranged on the outside of said wall at a short distance from the jamb face of said opening, an integral panel extension of said fender overlying part of but being slightly spaced from the outer surface of said wall between said fender and said opening, means for removably connecting the margin of said fender extension along said opening to said wall, said fender extension being provided along the margin removably connected to said wall with inwardly and laterally extending flanges or tabs, the laterally extending flanges or tabs projecting from the inwardly directed flange in the same direction as the adjacent portion of the fender extension, the wall being provided with means slidably engaged by said laterally extending flanges or tabs so that the connection between said fender and its extension to the wall may easily be dissolved by moving said fender in a plane substantially parallel to the plane of the opening and away from the center of the opening, additional readily releasable fastening means such as bolts and nuts provided between said fender and said body at another margin of the fender.

5. In a vehicle body, a wall comprising an opening having a jamb face and adapted to be closed by a closure member, a fender arranged on the outside of said wall at a short distance from said jamb face, an integral panel extension on said fender overlying the outside of said wall between said fender and said opening and provided with an inwardly and then reversely bent flange along the opening, means on said wall engaged by said reversely bent flange and forming therewith easily disconnectable fastening means holding said fender and its extension to said wall.

6. Integral fender and side panel structure for vehicles especially automobiles comprising a fender proper for covering part of a wheel on its outside and a panel extension adapted for covering the outside of a body wall between a wheel housing and an adjacent opening, a reversely bent flange along the margin of said panel extension destined to extend along said opening, said reversely bent flange being adapted for securing to the wall of a vehicle body along the opening by easily disconnectable fastening means.

THEODORE ULRICH.